April 20, 1926.　　　　　　　　　　　　1,581,228
A. PURAS Y SIERRA ET AL
FEEDING MECHANISM FOR PROJECTION APPARATUS
Filed Feb. 3, 1925　　　5 Sheets-Sheet 3

INVENTORS
Angel Puras y Sierra, and
Francisco del Rio y Hernandez
BY
B. Singer
ATTORNEY.

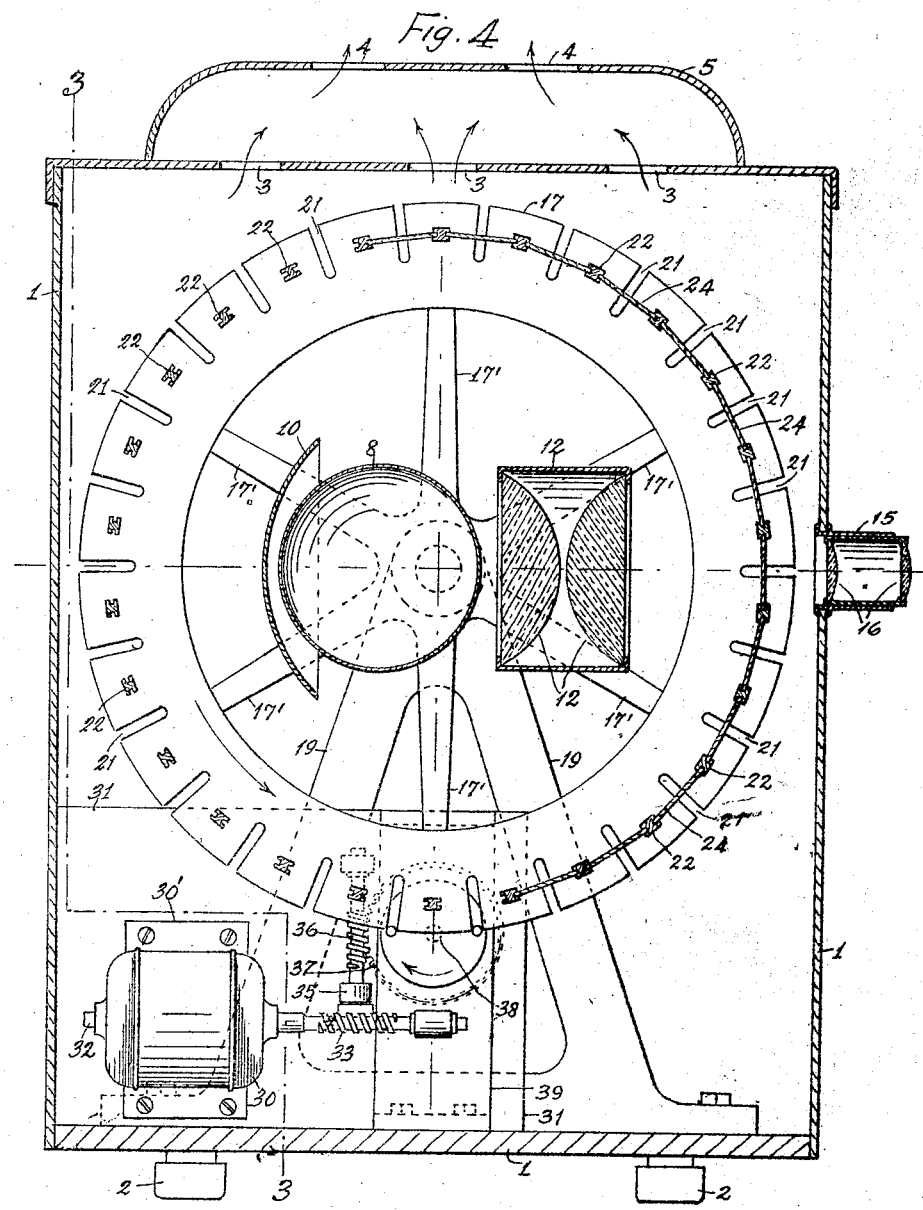

April 20, 1926.
A. PURAS Y SIERRA ET AL
1,581,228
FEEDING MECHANISM FOR PROJECTION APPARATUS
Filed Feb. 3, 1925    5 Sheets-Sheet 5
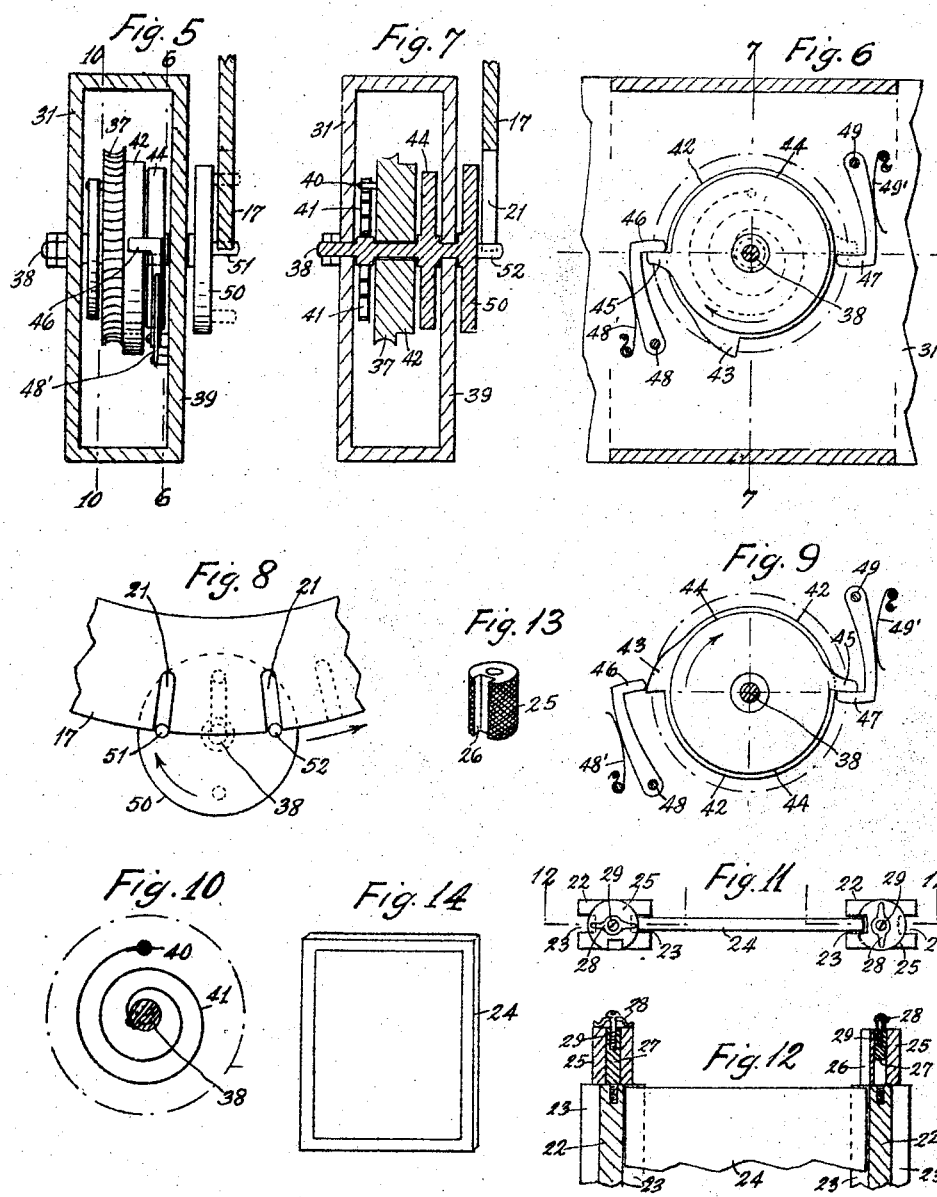

Patented Apr. 20, 1926.

1,581,228

UNITED STATES PATENT OFFICE.

ANGEL PURAS Y SIERRA AND FRANCISCO DEL RIO Y HERNANDEZ, OF CUETO, CUBA.

FEEDING MECHANISM FOR PROJECTION APPARATUS.

Application filed February 3, 1925. Serial No. 6,625.

*To all whom it may concern:*

Be it known that we, ANGEL PURAS Y SIERRA and FRANCISCO DEL RIO Y HERNANDEZ, citizens of the Republic of Cuba, and residents of Cueto, Province of Oriente, Cuba, have invented certain new and useful Improvements in a Feeding Mechanism for Projection Apparatus, of which the following is a specification.

This invention relates to apparatus for projecting unmoved pictures, and its object is to provide a mechanism for feeding the slides for the projection of the unmoved pictures, so that each slide be exposed during a predetermined time to the fagot of light rays of the projection apparatus.

Another object of the invention is to provide a mechanism for feeding the slides to the projection apparatus, which moves intermittently and with almost instantaneous movements for exposing the slide to the fagot of light rays and withdraw it away after having exposed it during a predetermined time.

Another object of the invention is to provide a slide-holder carrying a predetermined number of slides for unmoved views, and in which the slides are easily replaced.

And still a further object of the invention is to provide a simple opening and closing mechanism for fastening and removing the slides on the holders.

The invention is described with reference to the figures of the annexed drawings, in which:

Fig. 4 is a longitudinal vertical section view on line 4—4 of Fig. 3.

Fig. 5 is a detail view showing in side elevation the slide-holder operating mechanism, the casing being shown in section.

Fig. 6 is a section view of the same on line 6—6 of Fig. 5.

Fig. 7 is a section view on line 7—7 of Fig. 6.

Fig. 8 is a diagrammatic view showing the position of the slide-holder with respect to its operating mechanism.

Fig. 9 is a detail view showing in elevation the cam disc and the holding disc together with the rackets of the slide-holder operating mechanism.

Fig. 10 is a diagrammatic view of the coil spring forming part of the slide-holder operating mechanism.

Fig. 11 is a detail view showing in end elevation the fastening device of each slide.

Fig. 12 is a section view on line 12—12 of Fig. 11.

Fig. 13 is a perspective detail view showing the opening and closing member which forms part of the means for holding the slide in position.

Figure 1:
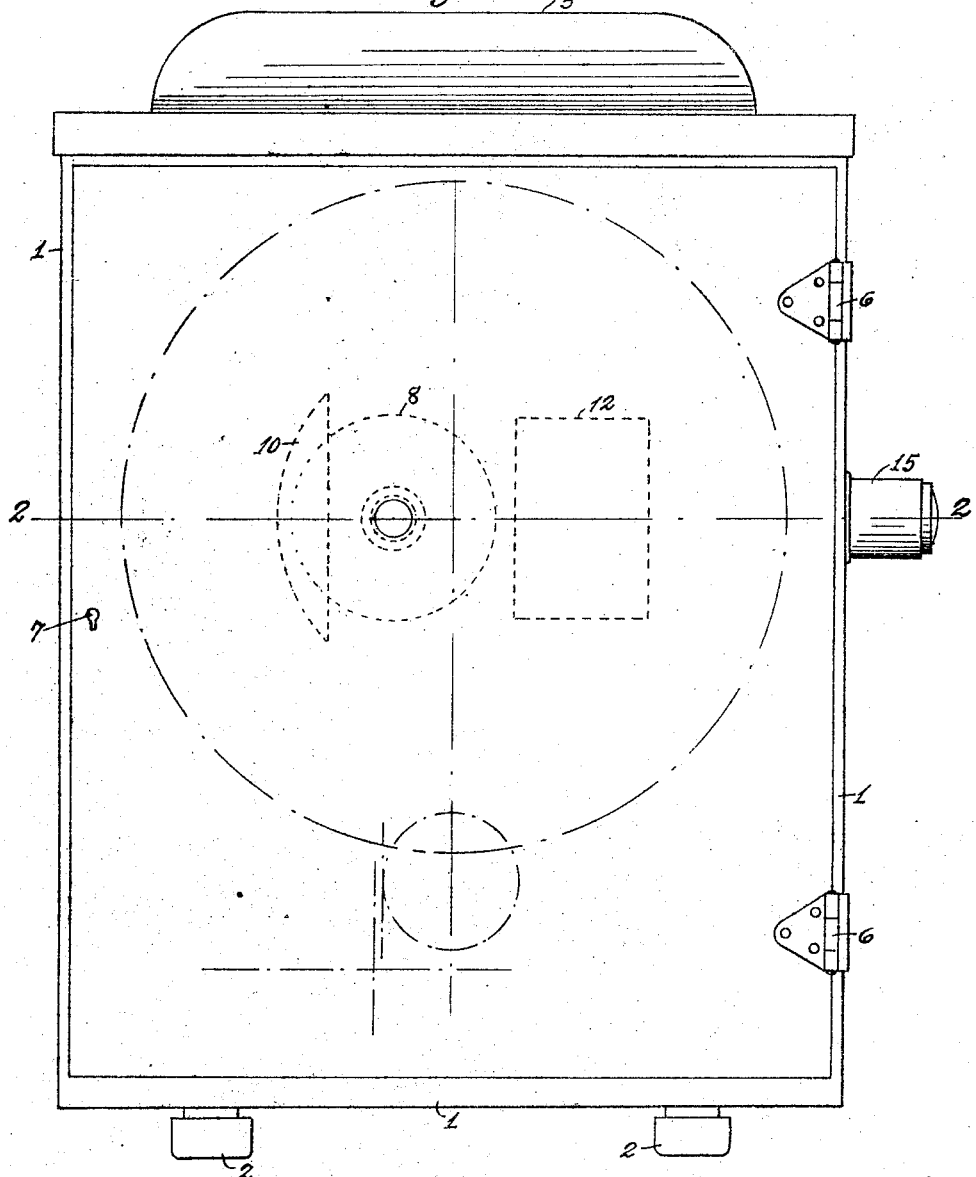
Fig. 1 is a front outer elevation view of a projection apparatus containing the feeding mechanism which is the subject matter of this invention.
Figure 2:
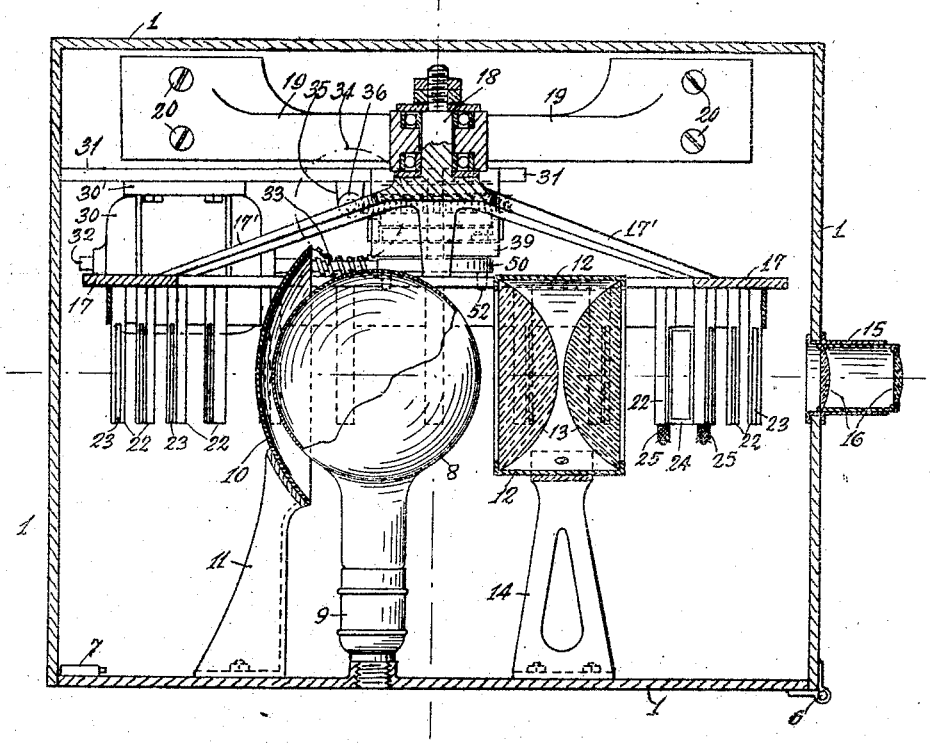
Fig. 2 is a horizontal section view on line 2—2 of Fig. 1.
Figure 3:
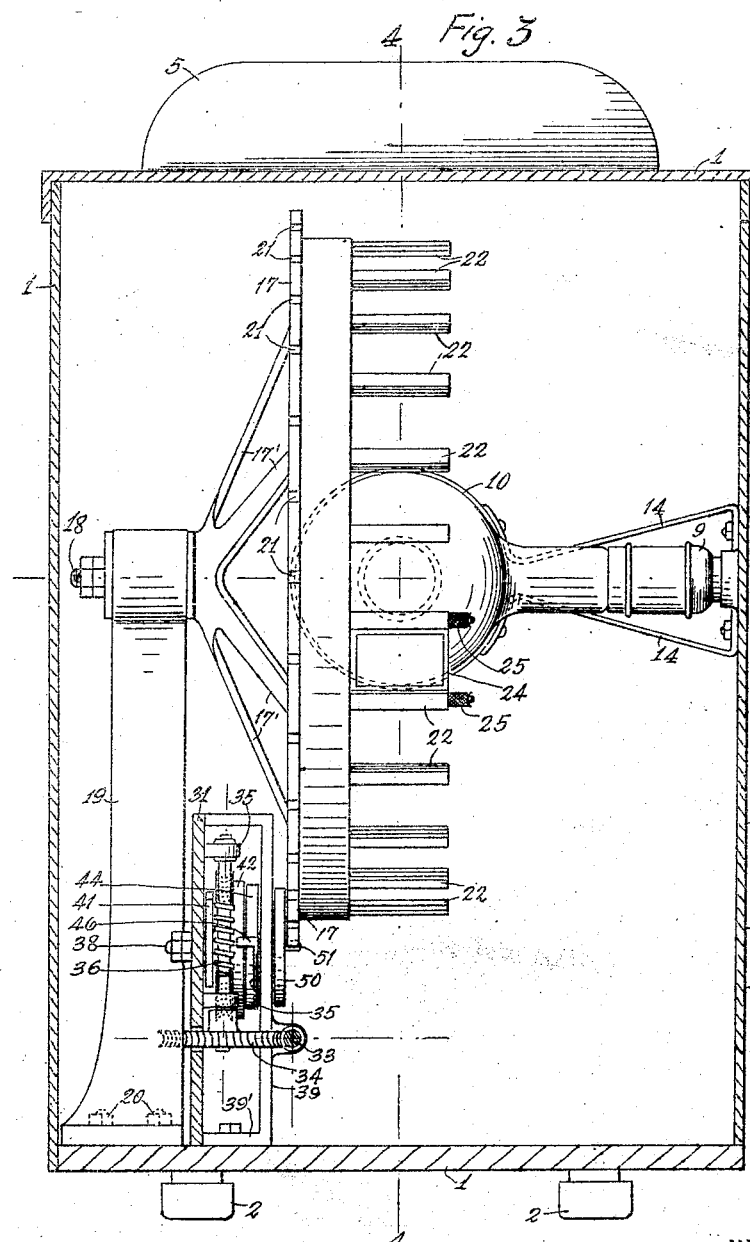
Fig. 3 is a cross vertical section view of the apparatus on line 3—3 of Fig. 4.

And Fig. 14 is a perspective detail view of a slide.

In the drawings, 1 indicates the casing of the apparatus, which is of rectangular section, its bottom being mounted on insulating bases 2, and its top presenting a plurality of openings 3 spaced apart and which do not correspond vertically with openings 4 in a second lid 5 annexed to said top part, for ventilation purposes.

Said casing 1 has its fore door-shaped part mounted on hinges 6 at one side and at the other side is provided with a lock or proper closure means 7. To said fore part are fixed inside and in longitudinal straight alinement an electric lamp 8 supported by a horizontal bracket 9, a reflector 10 connected to a bracket 11 and a cylindrical case 12 carrying inside a pair of convex-plane lenses 13 supported by a bracket 14 so that when the door is closed they will come in alinement with a tube 15 fixed to an end wall of case 1 which carry the two projecting lenses 16.

Around reflector 10, lamp 8 and lens case 12, is arranged the slide feeding mechanism, which consists in a large ring or plane vertical wheel 17 of spokes 17' which are oblique with respect to the plane of the wheel and to whose hub is integral a trunnion or horizontal shaft 18 rotatably mounted on a vertical bearing 19 whose base is secured by screws 20 on the bottom of case 1. The plane ring 17 is provided at its periphery with a plurality of radial slots 21 open at the periphery and equally spaced apart, and at the middle point of the distances which tangentially separate said radial slots 21 securely project forward from the fore face of the plane ring 17 a plurality of small supporting bars 22 arranged perpendicularly to the plane of ring 17 and all of the same length, each small bar 22 having a groove or channel 23 at each side for supporting and guiding each slide 24 between each two successive small bars 22. In this manner it will be possible to arrange on the plane ring 17 a number of slides 24 equivalent to the number of slots 21 in the same.

There are means for securing in position each slide in the grooves or channels 23 of the two supporting small bars 22, which means consist of two small rollers 25 each one provided with a longitudinal groove 26 and each rotatably mounted on a stem 27 horizontally fixed on the end of each supporting small bar 22, each small roller 25 being held on its respective stem 27 through a clip 28 pressing each small roller through a screw 29 fixed on the end of stem 27. When grooves 26 of two small rollers 25 mounted on the adjacent small bars 22 come into the same plane, it is permitted the insertion of a slide 24 into the channels 23 of the supporting small bars 22, and on swinging the small rollers 25 on its stem 27 until the grooves 26 are out of alinement, the slide 24 will not be able to be pulled out of its supporting position on the slide-holder ring 17. In order to aid the swinging of the small rollers 25 with the fingers, said rollers are made of corrugated surface, as indicated in Fig. 13.

As illustrated in Fig. 4, each slide 24 is exposed across the pencil of light rays of the projecting device, owing to the above mounting of the plane ring 17 with respect to the light projecting device.

The plane ring 17 has an intermittent motion for carrying each slide 24 across the pencil of light rays of the projection device, maintaining the same exposed during a predetermined time and withdrawing the same, the movements of approaching and withdrawing each slide being effected very rapidly so as to take as much time as possible in the exposition of the slide for obtaining each unmoved projection. As all the slides are mounted on the same circular slide-holder, the withdrawing movement of each slide is used for inserting the next rear slide across the light rays. The said intermittent motion of the ring 17 is imparted through the following mechanism: An electric motor 30 mounted by side supporting bases 30' on a vertical wall 31 fixed to the bottom and to the rear wall of case 1 has its driving shaft extended forming a horizontal worm gear 33 which meshes with a horizontal worm wheel 34 whose vertical shaft is mounted on bearings 35 fixed to the vertical wall 31 and said vertical shaft is of the shape of a worm gear 36 meshing with a vertical worm wheel 37 loosely mounted on a horizontal shaft 38 supported on said vertical wall 31 and on a vertical plate 39 parallel to said wall 31 and provided with a horizontal lower flange 39' through which it is fixed to the bottom of case 1 at a short distance from said wall, thereby forming a case with the same. Said worm wheel 37 is provided at its rear face with a pin 40 to which is connected the end of a spiral spring 41 whose other end is connected to shaft 38 in the same manner as a clock movement, and to said worm wheel 37 is integral a cam disc 42 having at its periphery a shoulder 43 which at its rear end is cut in radial direction and at its fore end forms a gradual inclination towards the periphery of disc 42. Adjacent the latter is securely mounted on shaft 38 another disc 44 provided at its periphery with a stop finger 45, which is adapted for engaging two angular ratchets or pawls 46 and 47 diametrally opposite with respect to disc 44 and which are pivotally mounted on pins 48 and 29 secured to vertical plate 39 and which tend to engage the periphery of disc 44 owing to the tension of two springs 48' and 49' securely mounted at one end on the same plate 39. Said ratchets 46 and 47 are wide enough to extend ahead of the periphery of cam disc 42 so to come along the gyratory course of shoulder 43 of this cam disc so that in each revolution of the same, said ratchets 46 and 47 will be raised out of the travel of stop finger 45 and leave the same free so that shaft 38 may rotate owing to the coiling of spiral spring 41. Fixed to the same shaft 38, but outside of the casing formed by the vertical wall 31 and vertical plate 39 is fixed a disc 50 carrying two diametrally opposite pins 51 and 52 which are below the plane ring 17 and which respectively engage two successive slots 21 of the latter, to which effect said pins 51 and 52 are separated at a distance apart which is equal to the distance between two slots 21, as shown in Fig. 8. Thus, when disc 50 rotates, pin 51 enters into a slot 21 and causes the plane ring 17 to rotate in arc a distance which is equal to the arc separating the middle lines of the two adjacent slots 21 until said pin is separated from the said slot 21 with which it has been engaging during a half of a revolution of disc 50, at which moment the pin 52 engages the following slot 21 of the plane ring 17 for producing another intermittent motion of the latter.

The operation of the operating mechanism of the slide-holder 17 is as follows: On rotating continuously the worm wheel 37 which is loose on shaft 38, causes the coiling of the spiral spring 41 on account of shaft 38 being quiet owing to the resistance opposed by the slide-holder 17 connected thereto, and on rotating also the cam lever 52 which is integral with worm wheel 37, the shoulder 43 engages ratchet 46 and causes same to be raised until getting out of the path of stop finger 45 (see Fig. 9)

whereby on thus being freed the disc 44 carrying the stop finger 45, the shaft 38 rotates in the same direction of the rotation of disc 42 owing to the tendency of spiral spring 41 to be uncoiled and therefore there is effected the rotation of disc 50 in an angular direction, which equals one half of a revolution of shaft 38 until stop finger 41 engages the other ratchet 47, which is just the required distance, as it has been explained, for the plane ring 17 gyrating sufficiently so that the slide 24 exposed to the fagot of light rays of the projection device, be withdrawn out of this pencil and the next slide 24 be placed across the light rays for effecting a new projection. On continuing the rotation of the worm wheel 37, the spiral spring 41 is coiled up again, and as the cam disc 42 also continues rotating, the shoulder 43 of the same engages then the second ratchet 47 causing it to raise out of the travel of the stop finger 45 that was held by the former, the disc 44 being thus freed, and owing to the tendency of spiral spring 41 to unroll, there is caused the rotation in the same direction of shaft 38 and disc 50 rotates in the second half of a revolution, and causes by the engagement of the second pin 52 with a new slot 21, a new advance of plane ring 17, withdrawing from the fagot of light rays of the projection device the slide 24 which was placed across said fagot of light rays in the former half revolution of the same disc 50, until stop finger 45 is held again by the first stop finger 46, and so on.

As it will be understood, the movements of disc 50 produced by the unrolling of spiral spring 41, are rapid enough so that the movements of inserting and withdrawing each slide 24 across the light rays be also sufficiently fast for producing the projection. And thus successively.

When it is desired to change any one of the slides in the slide-holder 17, the electric motor is stopped and the two small rollers 25 annexed to the support of slide 24 are conveniently turned until the two grooves 26 of the same come in alinement with channels 23 of the two small supporting bars 22, whereupon the slide 24 can be changed for another one.

It is obvious that the details of construction of the mechanism for feeding the slides to the projection device can be varied without departing from the spirit of the invention which is as set forth in the appended claims.

What we claim is:—

1. A feeding mechanism for projection apparatus, comprising a rotatory member having a plurality of equidistant radial slots opened at the periphery and carrying an annular plurality of slides removably arranged in tangential position on a face of said rotatory member so that each slide may be arranged across the pencil of light rays of the projection device removably arranged in the space surrounded by the said annular plurality of slides, a supporting frame, a driving shaft, an auxiliary horizontal shaft rotatorily mounted beyond the periphery of said rotatory member, a gear wheel loosely mounted on this auxiliary shaft, a spiral spring coiled on this auxiliary shaft having one end connected to a point of said gear wheel and the other end connected to said auxiliary shaft, a cam disc integral with said gear wheel and having a peripheral shoulder, a disc fixed to the auxiliary shaft adjacent said cam disc and having a peripheral stop finger designed to be locked by two spring pressed ratchets and pivotally mounted on fixed points of the supporting frame, the ratchets being extended to the front of the cam disc periphery, and a disc securely mounted on said auxiliary shaft and provided on one of its faces with a pair of diametrally opposite pins and adapted to successively engage two successive radial slots of the rotatory member.

2. A feeding mechanism for projection apparatus, comprising a rotatory member carrying a plurality of slides arranged in raised position on one of its faces, each slide being mounted on supporting small bars which are perpendicularly fixed to said rotatory member and which have opposite longitudinal grooves in which the slides fit headwise and means for securely locking each slide in its display position consisting in rotatory members on the ends of the supporting small bars, each one having a longitudinal groove capable of coming in longitudinal alinement with the groove of the supporting small bar for freely admitting the slide along said grooves.

In witness whereof we affix our signatures.

ANGEL PURAS y SIERRA.
FRANCISCO del RIO y HERNANDEZ.